Aug. 14, 1962     K. ROSENBAUM ET AL     3,049,162
EMERGENCY SUPPORT
Filed March 18, 1957
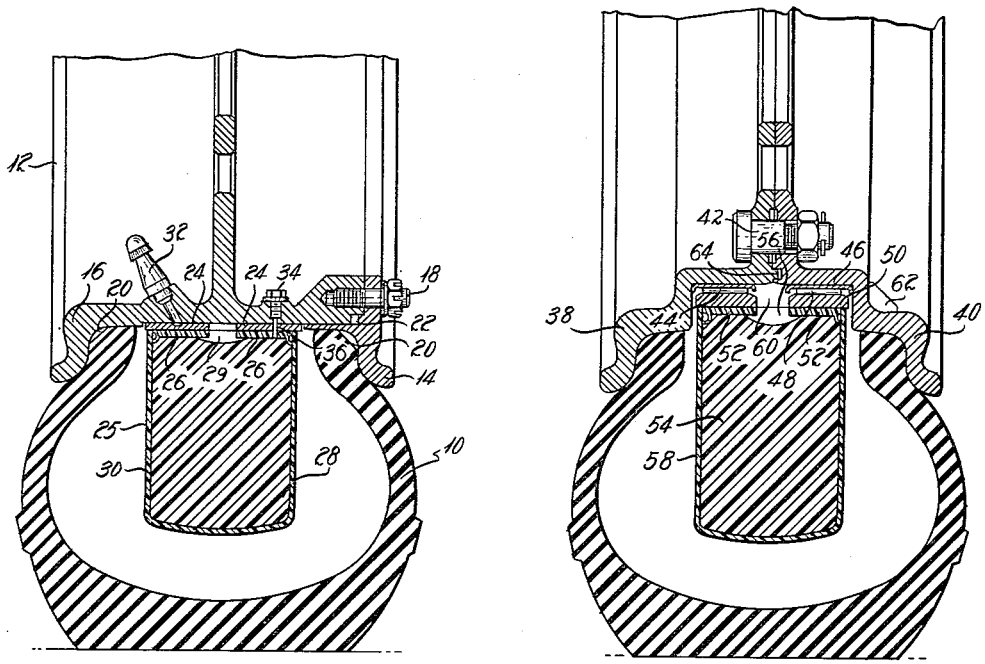
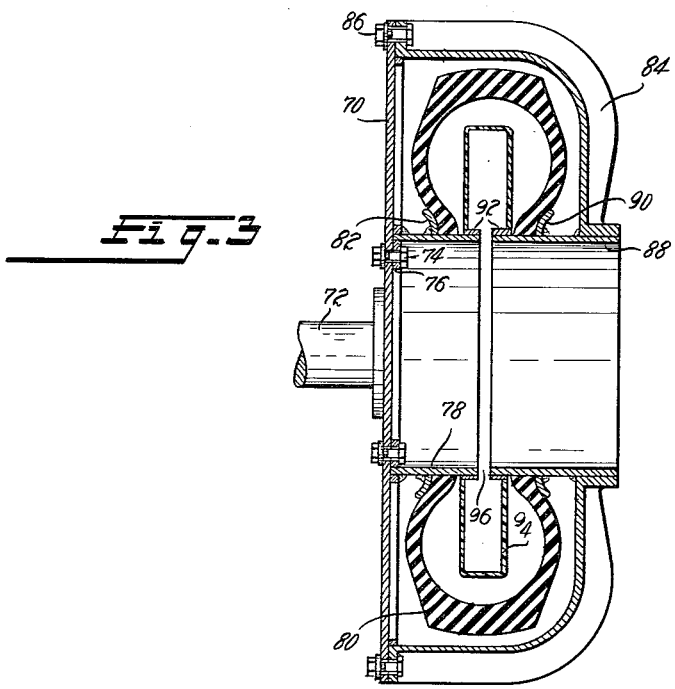
INVENTORS
KURT ROSENBAUM
WALTER BELL
FRIEDRICH OST
ATTORNEYS 3,049,162
EMERGENCY SUPPORT
Kurt Rosenbaum, Essen, Walter Bell, Dusseldorf, and Friedrich Ost, Gross-Konigsdorf, near Koln, Germany, assignors to Alweg-Forschung G.m.b.H., Koln, Germany, a corporation of Germany
Filed Mar. 18, 1957, Ser. No. 646,763
3 Claims. (Cl. 152—158)

This invention relates to emergency supports for pneumatic tires and to methods for forming and installing such supports.

The emergency support structures of the general type with which the invention is concerned comprise ring shaped assemblies positioned within pneumatic tires and which are normally out of contact with the inner surface of the tire but which are effective to provide support for the tire when it becomes fully or partially deflated to protect the vehicle against the danger normally incident to tire blowout and to permit the vehicle to be driven to a point where the tire can be changed conveniently.

In the past, emergency support structures of this kind have been proposed which comprise relatively heavy metal rings which are formed segmentally to facilitate their assembly within the tire. In some cases, balls, rollers and the like have been used which were connected to each other by flexible or elastic members to permit their insertion into heavy duty, thick walled tires. While such constructions have provided the necessary emergency support, nevertheless they are prohibitively heavy for many uses and their cost is usually excessive.

It is the primary purpose and object of the present invention to provide emergency supports for pneumatic tires which are simple to manufacture and which can be inserted into the tire easily, which are of low weight and which permit the vehicle to be driven along considerable distances without danger and without destroying the tire or the support even if the tire is completely deflated.

These primary objects and others are achieved by the present invention by the provision of an emergency support formed of a plastic material having a relatively hard rigid inner ring supported on the outer surface of the wheel rim. In accordance with the invention, the emergency support may be fabricated from a homogeneous plastic material or may be composed of layers of different materials which possess different elasticity, strength, and other physical characteristics. For example, the layers adjacent the wheel rim may be made of the relatively hard elastic plastics such as the poly-urethane polyamides or the like and the outer layers may be made of a lighter substance such as polyethylene with suitable additives.

The relative complexity, high weight and cost of the prior emergency assemblies has been due largely to the difficulty of providing a support assembly having the desired strength and rigidity in operation and yet which may be easily installed within heavy duty tires. It is, accordingly, another important object of the present invention to provide novel methods for forming or installing emergency support structures within the tire which obviates these difficulties.

In accordance with the present invention, the ring structures are made of a thermo-plastic material which is sufficiently deformable when heated to permit ready insertion of the support structure into the tire. The invention also includes a novel method for initially fabricating a support structure within the tire.

Additional objects and advantages will become apparent as the description proceeds in connection with the accompanying drawings in which:

FIGURE 1 is a cross-section of the pneumatic tire with the emergency support of the present invention mounted on a one-piece rim;

FIGURE 2 is a similar section of a further embodiment with a longitudinally split rim; and FIGURE 3 is a cross-section of an apparatus for centrifugally casting the emergency support inside the tire.

Referring now more particularly to the drawings, FIGURE 1 shows a conventional tubeless tire 10 mounted on a single-piece rim generally designated by the numeral 12. The tire 10 is secured to the rim 12 by means of a rim ring 14 and rests with its other side against the rim bead 16. The rim ring 14 is screwed to the rim 12 by means of bolt and nut constructions 18. The outer circumference of the rim is substantially cylindrical. Between the beads of the tire and the rim, elastic packings 20 are provided to seal the air space enclosed by the tire. A further sealing packing 22 is provided between the rim ring 14 and the rim 12.

At the outer cylindrical surface of the rim 12, a bearing ring 24, preferably made of bronze, is slidably mounted. This ring 24 carries the actual emergency support assembly indicated generally at 25 which comprises a support layer 26 and a substantially rectangular ring member 28. Both the layer 26 and the ring member 28 are made of plastics which are elastically deformable at elevated temperatures, e.g. foamed thermoplastic materials sold under the trademark "Moltopren." Thus, the entire emergency support assembly, when heated, can be inserted into the tire 10 through the aperture between the tire beads. After cooling, the plastic again becomes fairly rigid and adopts its previous shape.

Shaping of the ring 28 is performed outside the tire in a mold in a conventional manner. Preferably, an elastic covering 30 made of plastic is bonded to the layer 26. This covering together with the layer may be first mounted within the tire and afterwards the ring member 28 is inserted into it in the manner described above. A grease fitting 32 is provided for lubricating the contacting surfaces of the rim 12 and the bronze bearing ring 24.

To prevent a shifting of the emergency support around the rim 12, which may be caused by rotary acceleration or deceleration of the wheel when the tire is inflated, a shear bolt 34 is screwed into the rim and extends into a corresponding recess 36 in the ring 24. When the tire is wholly or partially deflated and is pressed against the outer circumference of the emergency support, the load of the wheel is transmitted to this support. This causes a relative movement between the tire and the emergency support which causes the shear bolt 34 to become sheared off to permit relative movement between the rim and the emergency support. Accordingly, neither the inside surface of the tire nor the outer surface of the emergency support is exposed to undue abrasion.

FIGURE 2 shows a further embodiment of the present invention in which a longitudinally split drop-center rim is used. The rim comprises two halves 38 and 40 which are conventionally secured to each other by bolt and nut consstructions 42. To permit free rotation of the emergency support on the rim, two needle bearing assemblies 44 and 46 are provided. Two rings 50 which are mounted outside of the bearing assemblies carry sublayers 52 for the emergency support ring 54. The sublayers 52 which comprise two parallel rings are united by means of hoops 56. A cover 58 enclosing the ring 54 is bonded to the layers 52.

In this embodiment the emergency support is fabricated within the tire. For this purpose the plastic is piped in a liquid state into the covering 58 through the space 60 between the needle bearing assemblies 44 and 46 and between the two rings 50 and layers 52 when the bolts 42 are unscrewed and the two halves of the rim are separated slightly. Preferably the plastic is of the type which quickly adopts a foamy constitution when hardening, for example, a nitrogen liberating poly-ethylene composition or the like. A shear bolt between the wheel rim and the ring similar to that of FIGURE 1 may also be included in this assembly. For this purpose and for securing an air valve to the rim 40, bosses 62 are provided. Preferably the shear bolt is also made of plastic. The rim halves 38 and 40 are preferably sealed by an air tight packing 64.

The construction described permits insertion of the layers 52 and fabrication of the emergency support 54 within the tire and the subsequent insertion of the needle bearing assemblies 44 and 46 and the rings 50 without deforming the tire or the emergency support when the wheel is assembled. Therefore, plastics can be utilized which have a higher heat resistance and therefore offer sufficient safety against softening when the temperature of the tire increases.

If desired the plain bearing of FIGURE 1 may be substituted for the needle bearings shown in FIGURE 2.

The emergency support shown in FIGURE 1 can be similarly fabricated within the tire as follows: After the sublayers 26 together with the covering 30 have been assembled, the foamy plastic is piped into the hollow space within the covering through a corresponding opening near the center of the rim 12. The plug of plastic remaining in this opening may be utilized instead of the separate metallic shear bolt 34.

FIGURE 3 illustrates an apparatus for fabricating the emergency support within the tire by means of a centrifugal casting process. The material used in this case is a foamy plastic which is cast in a warm and liquid state and hardens after cooling. The apparatus of FIGURE 3 includes a disc 70 rigid with a shaft 72 which is driven by a motor (not shown). Secured to the disc 70 by means of bolts and nuts 74 is a ring member 76 to which a cylinder 78 is welded, the outer diameter of the cylinder corresponding to the diameter of the inner opening of the tire 80. At the outer surface of the cylinder a stop collar 82 corresponding to a rim bead is rigidly secured for example by welding. At the outer circumference of the disc 70 a number of yokes 84 are screwed by means of bolts and nuts 86. The yokes at their inner free ends are welded to a second cylinder 88 which is in alignment with and has the same diameter as the cylinder 78 and which carries a similar stop collar 90.

The casting process takes place as follows. First the plastic sublayers 92 with the plastic covering 94 secured to them for example by fusing or bonding are positioned in the tire which is slipped over the free end of the cylinder 78. The cylinder 88 is then installed and the yokes 84 are screwed to the disc 70. The stop collars 82 and 90 keep the tire in its correct position. Then the shaft and the cylinders and the tire are rotated and a liquid plastic, preferably a foaming plastic is piped into the covering through a suitable piping system for example an elbow leading from the open side of the cylinder 88 into the open space 96 between the cylinders 78 and 88.

Due to the centrifugal forces this foamy plastic is first deposited inside of the outer portion of the covering 94 and gradually fills out the entire hollow space within the covering 94 until the emergency support is completely filled. If desired, different plastics may be successively piped into the covering 94 to obtain a series of layers of different hardness, the outer layer being the hardest to protect the plastic body against local overstrains. After the emergency support has been prepared inside the tire, the apparatus is disassembled and the tire together with emergency support is mounted on the rim.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for forming an emergency support assembly within a beaded pneumatic tire casing in which a thin walled annulus having an essentially cylindrical outer peripheral wall and essentially flat radial walls is mounted to define an annular space for said support within said tire, said annulus being open along its inner diameter in the region between the beads of said casing, comprising a pair of cylinders having an outer diameter substantially equal to the inner diameter of the tire beads, means for supporting said cylinders in aligned relation with their adjacent ends spaced apart to form an annular gap, means on the cylinders for supporting the beads of said tire in spaced relation at opposite sides of said gap, means for rotating said cylinders to thereby rotate said tire, and relatively fixed means for introducing a liquid air-hardening plastic through the space between said cylinders into said annular gap within said annulus.

2. An emergency support for use with a penumatic tire mounted on a rim comprising a continuous solid annular plastic body of substantially rectangular section having a full width cylindrical inner surface and enclosed within said tire, the outer surface of said body being normally spaced from the inner surface of said tire, said body being adapted to support said tire when the tire is deflated, said plastic body comprising a relatively hard inner sub-layer adjacent said rim, a sheet-like covering secured to said sub-layer and forming therewith an annular space, and a light, strong porous plastic filling said space, a bearing assembly between said rim and said cylindrical inner surface of said plastic body to permit relative rotation of said body with respect to said rim when said tire is deflated, and a shear pin normally preventing rotation between said rim and said body when said tire is inflated.

3. The method of providing a plastic emergency support ring within a pneumatic tire casing having spaced apart rim engaging beads comprising the steps of inserting a hollow plastic annulus within said casing through the space between said beads to form an enclosed space for said support within said tire, disposing said annulus within said casing with the walls of said annulus spaced from the corresponding wall portions of said casing, rotating said tire and said annulus, and filling said annulus with a liquid air-hardening plastic while said tire is rotating.

References Cited in the file of this patent

UNITED STATES PATENTS

| | | |
|---|---|---|
| 1,295,011 | Doss | Feb. 18, 1919 |
| 1,503,432 | Schragin | July 29, 1924 |
| 1,995,977 | Gonda | Mar. 26, 1935 |
| 2,037,832 | Stanley | Apr. 21, 1936 |
| 2,040,645 | Dickinson | May 12, 1936 |
| 2,040,759 | Nore | May 12, 1936 |
| 2,208,868 | Kraft | July 23, 1940 |
| 2,262,780 | Sherwood | Nov. 18, 1941 |
| 2,308,959 | Brink | Jan. 19, 1943 |
| 2,338,235 | Eger | Jan. 4, 1944 |
| 2,349,549 | Hardman et al. | May 23, 1944 |
| 2,659,107 | De Bell | Nov. 17, 1953 |
| 2,719,327 | Pique | Oct. 4, 1955 |
| 2,745,461 | Rossi | May 15, 1956 |
| 2,775,282 | Kennedy | Dec. 25, 1956 |

UNITED STATES PATENT OFFICE
CERTIFICATE OF CORRECTION

Patent No. 3,049,162                      August 14, 1962

Kurt Rosenbaum et al.

It is hereby certified that error appears in the above numbered patent requiring correction and that the said Letters Patent should read as corrected below.

Column 4, line 25, for "the space" read -- said annular gap --; line 26, for "said annular gap" read -- the space --.

Signed and sealed this 29th day of January 1963.

(SEAL)
Attest:

ERNEST W. SWIDER
Attesting Officer

DAVID L. LADD
Commissioner of Patents